United States Patent
Gaudig et al.

(10) Patent No.: US 12,446,604 B2
(45) Date of Patent: *Oct. 21, 2025

(54) PROCESS AND APPARATUS FOR THE PRODUCTION OF A MEAT ANALOGUE

(71) Applicant: Mars, Incorporated, McLean, VA (US)

(72) Inventors: Harm Henning Gaudig, Verden (DE); Walter Wilhelm Krueger, Verden (DE); Lothar Helmut Meyer, Verden (DE); Elena Ogneva, Verden (DE)

(73) Assignee: MARS Incorporated, McLean, VA (US)

(*) Notice: Subject to any disclaimer, the term of this patent is extended or adjusted under 35 U.S.C. 154(b) by 549 days.

This patent is subject to a terminal disclaimer.

(21) Appl. No.: 17/257,510

(22) PCT Filed: Jul. 1, 2019

(86) PCT No.: PCT/US2019/040099
§ 371 (c)(1),
(2) Date: Dec. 31, 2020

(87) PCT Pub. No.: WO2020/009980
PCT Pub. Date: Jan. 9, 2020

(65) Prior Publication Data
US 2021/0259291 A1      Aug. 26, 2021

(30) Foreign Application Priority Data

Jul. 2, 2018 (DE) .................... 10 2018 115 961.7

(51) Int. Cl.
*A23L 13/60* (2016.01)
*A23K 10/20* (2016.01)
*A23K 50/48* (2016.01)

(52) U.S. Cl.
CPC .............. *A23L 13/60* (2016.08); *A23K 10/20* (2016.05); *A23K 50/48* (2016.05); *A23V 2300/08* (2013.01); *A23V 2300/24* (2013.01)

(58) Field of Classification Search
CPC ........ A23K 10/30; A23K 10/20; A23K 50/48; A23L 13/60
See application file for complete search history.

(56) References Cited

U.S. PATENT DOCUMENTS

| | | | |
|---|---|---|---|
| 5,474,790 A | 12/1995 | Franklin et al. | |
| 5,945,152 A | 8/1999 | Purser | |
| 2008/0268112 A1* | 10/2008 | Rolan | A23L 13/65 426/601 |
| 2012/0160841 A1 | 6/2012 | Kimrey, Jr. et al. | |
| 2015/0320085 A1 | 11/2015 | Ray | |
| 2016/0219904 A1 | 8/2016 | Reynes | |

FOREIGN PATENT DOCUMENTS

| | | |
|---|---|---|
| DE | 102016125870 A1 | 7/2018 |
| EP | 1231846 B2 | 2/2013 |
| WO | 2007011597 A2 | 1/2007 |
| WO | 2015/172002 A2 | 11/2015 |
| WO | 2016/055940 A1 | 4/2016 |
| WO | 2018125615 A1 | 7/2018 |

OTHER PUBLICATIONS https://williamscarver.com/wp-content/uploads/2014/09/Waukesha-Scraped-Surface-Heat-Exchangers.pdf (Year: 2012).*

* cited by examiner

*Primary Examiner* — Vera Stulii
(74) *Attorney, Agent, or Firm* — Morrison & Foerster LLP

(57) ABSTRACT

Processes for the production of a meat analogue, comprising: a) introducing a meat batter which comprises protein into a first heating unit and heating the meat batter to a temperature above the denaturation temperature of the protein in the meat batter, but below the melting point of the protein to produce a first heat-treated product, and b) transferring the first heat-treated product to a second heating unit and heating the first heat-treated product to a temperature above the melting temperature of the protein to produce a second heat-treated product, c) cooling the second heat-treated product by moving through a cooling unit, so that the second heat-treated product has a temperature below water boiling temperature at ambient pressure when exiting the cooling unit, and d) dividing the cooled second heat-treated product into pieces; as well as an apparatus for the production of a meat analogue.

3 Claims, No Drawings

PROCESS AND APPARATUS FOR THE PRODUCTION OF A MEAT ANALOGUE

CROSS-REFERENCE TO RELATED APPLICATIONS

This application is a U.S. national stage patent application of International Patent Application No. PCT/US2019/040099, filed on Jul. 1, 2019, which claims the priority of DE Application No. 10 2018 115 961.7, filed Jul. 2, 2018, the entire contents of each of which are incorporated herein by reference.

FIELD OF THE DISCLOSURE

The presently disclosed subject matter relates to processes and apparatuses for the production of food components, and more particularly meat analogues, for use in pet or human foods.

BACKGROUND OF THE DISCLOSURE

Pet foods have long been manufactured from animal by-products and non-animal derived ingredients to prepare high quality food that provides pets with the required nutrient profile without competing with the human food demand for meat. As the global population increases, the global demand for high protein foods including meat is expected to increase. Thus, there is a growing need for pet foods prepared from meat analogues, which meet the nutritional needs of pets and which are also sufficiently palatable.

Meat analogues are typically prepared by mixing, chopping and emulsifying a mixture of raw meat ingredients such as beef, pork, lamb, chicken or combinations thereof obtained from the muscle tissue and meat by-products. These raw meat ingredients are then mixed with various dry ingredients, for example vegetable by-products, starches, vitamins, minerals, gums, and glutens, to make a meat emulsion. The resulting meat emulsion is then extruded into a continuous slab or sheet that is further transferred into a steam tunnel where the slab or sheet is cooked by exposing it to heat. The cooked slab or sheet is then chopped into pieces forming meat analogues. A sauce preparation or the like can be optionally added, and the meat analogues are then packed and processed for sterilization.

WO 2016/055940 A1 discloses a method for producing non-meat food products having appearance and texture of cooked meat. The method comprises mixing dry ingredients comprising vegetable proteins with wet ingredients comprising at least one of water or oil to form a non-meat dough; heating the non-meat dough under pressure at a temperature from 110-180° C.; and gradually cooling the heated non-meat dough to form a non-meat food product. EP 1 231 846 B2 discloses a method for producing a meat emulsion product. The method comprises forming a meat emulsion containing at least 29% by weight protein, 4-7% by weight fat and 49-53% by weight moisture; comminuting and heating the meat emulsion to a temperature of 140-154° C.; introducing the emulsion into a processing zone; subjecting the meat emulsion to a pressure of 1380-2415 kPa; and discharging the meat emulsion from the zone. According to WO 2016/055940 A1 and EP 1231 846 B2, heating is a one-step operation to achieve the final temperature of 180° C. and 154° C., respectively. WO 2015/172002 A2 discloses a method for producing meat-like chunks, wherein a meat slurry is introduced to a first scraped heat exchanger at a pressure of at least 1241 kPa. Heat is applied to the first scraped heat exchanger to produce a first heat-treated meat product having a temperature of 38-66° C. The first heat-treated meat product is then transferred to a second scraped heat exchanger and heat is applied to the second scraped heat exchanger to produce a second heat-treated meat product having a temperature of 60-85° C. The second heat-treated meat product is then transferred to a steam tunnel for further processing. The process fails to provide a sufficient meat-like fibrous structure of the chunks.

Thus, there remains a need for improved and stable processes and apparatuses for performing the same in the production of meat analogues with improved uniformity and/or palatability. The disclosed subject matter addresses these and other needs.

SUMMARY OF THE DISCLOSURE

The present disclosure provides novel processes for the production of meat analogues which are more stable than existing processes and apparatuses for performing the same. Such novel process can be more precisely controlled during operation and surprisingly and advantageously provide meat analogues with improved uniformity and/or palatability as compared to existing meat analogues. Processes of the present disclosure further enable for the preparation of meat analogues from meat batter while significantly reducing the exposure of the meat batter to very high temperatures.

Further, the meat analogues provided herein have unexpected improved palatability as compared to meat analogues prepared by conventional processes. The present disclosure further provides apparatuses for the production of meat analogues according to the disclosed processes. The present disclosure also provides processes for producing pet or human food from the meat analogues of the present disclosure.

The present disclosure provides processes for the production of a meat analogue comprising: a) introducing a meat batter which comprises protein into a first heating unit and heating the meat batter to a temperature above the denaturation temperature of the protein in the meat batter but below the melting point of the protein to produce a first heat-treated product, b) transferring the first heat-treated product to a second heating unit and heating the first heat-treated product to a temperature above the melting temperature of the protein to produce a second heat-treated product, c) cooling the second heat-treated product by moving through a cooling unit, so that the second heat-treated product has a temperature below water boiling temperature at ambient pressure when exiting the cooling unit, and d) dividing the cooled second heat-treated product into pieces.

In certain embodiments, a volume ratio of the first heating unit to the second heating unit can be from about 1.5-1:1 or about 1.2-1:1.

In certain embodiments, at least one of the first and second heating units can include a scraped surface heat exchanger.

In certain embodiments, the first and second heating units can both comprise a scraped surface heat exchanger.

In certain embodiments, the meat batter is heated in the first heating unit to a temperature of from about 90° C. to about 125° C.

In certain embodiments, the first heat-treated product is heated in the second heating unit to a temperature of from about 140° C. to about 170° C.

In certain embodiments, the ratio of residence time of the meat batter in the first heating unit to the residence time of the first heat-treated product in the second heating unit can be from about 1:1 to about 14:2 or from about 9:8 to about 6:2.

In certain embodiments, the pressure in the first heating unit can be from about 800 kPa to about 2000 kPa, and/or the pressure in the second heating unit can be from about 800 kPa to about 2000 kPa.

In certain embodiments, the meat analogue produced can have improved palatability as compared to meat analogues prepared by conventional processes.

The present disclosure provides for meat analogues prepared according to the processes as disclosed herein and for human and pet food products including the same. In certain embodiments, the present disclosure provides a human food product which can include the meat analogue prepared in accordance with processes of the present disclosure. In certain embodiments, the present disclosure provides a pet food product which can include the meat analogue prepared in accordance with processes of the present disclosure.

The present disclosure provides for an apparatus for the product of a meat analogue comprising: i) a first heating unit, ii) a first transfer means for transferring a meat batter which comprises protein into the first heating unit, the first heating unit being operable to be heated to a temperature above the denaturation temperature of the protein but below the melting temperature of the protein, iii) a second heating unit being operable to heat a first heat-treated product obtained from the first heating unit to a temperature above the melting temperature of the protein in the first heat-treated product, wherein the first heating unit and the second heating unit are arranged in series, iv) a cooling unit located downstream the second heating unit and operable to cool down a second heat-treated product obtained from the second heating unit below water boiling temperature at ambient pressure when exiting the cooling unit, and v) a dividing unit located downstream the cooling unit suitable for dividing cooled down second heat-treated product obtained from the cooling unit into pieces.

In certain embodiments, the apparatus can additionally comprise one or more of: i) a grinder, ii) a mixer, iii) an emulsifying unit or an emulsion pump installed upstream of the first transfer means, iv) a conditioning unit, v) a packaging unit, or vi) a sterilization unit installed downstream of the second heating unit.

In certain embodiments, a volume ratio of the first heating unit to the second heating unit can be from about 1.5-1:1 or about 1.2-1:1.

In certain embodiments, at least one of the first and second heating units can include a scraped surface heat exchanger.

In certain embodiments, the first and second heating units can both include a scraped surface heat exchanger.

In certain embodiments, the cooling unit can be operable to cool down the second heat-treated product to a temperature of less than about 80° C.

In certain embodiments, the first heating unit can be operable to heat the meat batter to a temperature of from about 90° C. to about 125° C.

In certain embodiments, the second heating unit is operable to heat the first heat-treated product to a temperature of from about 140° C. to about 170° C.

DETAILED DESCRIPTION OF THE DISCLOSURE

The present disclosure provides highly stable processes for the production of meat analogues and apparatuses for use in the same. Meat analogues produced in accordance with the methods and apparatuses of the present disclosure exhibit improved uniformity and/or palatability as compared to existing meat analogues. Such processes can be more precisely controlled during operation and advantageously significantly reduce the exposure of meat batter to very high temperatures during the production of such meat analogues. Additionally, the meat analogues prepared in accordance with the processes of the present disclosure have unexpected improved palatability as compared to meat analogues prepared by conventional processes. The present disclosure further provides processes for producing pet or human food from the meat analogues of the present disclosure.

For clarity and not by way of limitation, this detailed description is divided into the following sub-portions:
4.1. Definitions;
4.2. Methods of making meat analogues; and
4.3. Methods of using meat analogues.

4.1 Definitions

The terms used in this specification generally have their ordinary meanings in the art, within the context of this disclosure and in the specific context where each term is used. Certain terms are discussed below, or elsewhere in the specification, to provide additional guidance in describing the compositions and methods of the disclosure and how to make and use them.

As used in the specification and the appended claims, the singular forms "a," "an" and "the" include plural referents unless the context clearly dictates otherwise. Thus, for example, reference to "a compound" includes mixtures of compounds.

As used herein, the terms "about" or "approximately" means within an acceptable error range for the particular value as determined by one of ordinary skill in the art, which will depend in part on how the value is measured or determined, i.e., the limitations of the measurement system. For example, "about" can mean within three or more than three standard deviations, per the practice in the art. Alternatively, "about" can mean a range of up to 20%, preferably up to 10%, more preferably up to 5%, and more preferably still up to 1% of a given value. Also, particularly with respect to systems or processes, the term can mean within an order of magnitude, preferably within five-fold, and more preferably within two-fold, of a value.

As used herein, the terms "animal" or "pet" as used in accordance with the present disclosure refers to domestic animals including, but not limited to, domestic dogs, domestic cats, horses, cows, ferrets, rabbits, pigs, rats, mice, gerbils, hamsters, goats, and the like. Domestic dogs and cats are particular non-limiting examples of pets. The term "animal" or "pet" as used in accordance with the present disclosure can further refer to wild animals, including, but not limited to bison, elk, deer, venison, duck, fowl, fish, and the like.

As used herein, the terms "animal feed," "animal feed compositions," "pet food," "pet food article," or "pet food composition" are used interchangeably herein and refer to a composition intended for ingestion by an animal or pet. Pet foods can include, without limitation, nutritionally balanced compositions suitable for daily feed, such as kibbles, as well as supplements and/or treats, which can be nutritionally balanced. In an alternative embodiment, the supplement and/or treats are not nutritionally balanced. In that regard, the terms "animal feed," "animal feed compositions," "pet food," "pet food article," or "pet food composition" encompass both pet treats and pet primary foods, as defined herein.

As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus.

As used herein, the terms "denatured" or "denaturation" related to proteins means that denatured proteins have lost their three-dimensional structure. Denatured proteins can exhibit a wide range of characteristics, from loss of solubility to protein aggregation. Someone skilled in the art is well aware what is to be understood under a denatured protein.

As used herein, the terms "dividing" or "divided" refer to any operation to comminute a product, for example cutting, ripping, tearing, squeezing, hammer milling, etc.

As used herein, references to "embodiment," "an embodiment," "one embodiment," "in various embodiments," etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, the terms "palatability" or "palatable" refer to being desirable to the palate or taste. Further, the terms "palatability" or "palatable" as used herein refer to the extent to which a pet food product appeals to the palate or taste of an animal. This is suitable measured by feeding tests, e.g., difference tests or ranking tests. In certain embodiments, "palatability" can mean a relative preference for one food product over another. For example, when an animal shows a preference for one of two or more food products, the preferred food product is more "palatable", and has "enhanced palatability" or "increased palatability". In certain embodiments, the relative palatability of one food product compared to one or more other food products can be determined, for example, in side-by-side, free-choice comparisons, e.g., by relative consumption of the food products, or other appropriate measures of preference indicative of palatability.

As used herein, the term "meat analogue" refers to a meat substitute suitable for use in pet or animal food as a meat replacement, which can suitably be a "chunk". The meat analogue can have sensory attributes similar to cooked meat. Meat analogues can be incorporated into pet or human food products. They can be particularly suitable for inclusion in wet pet food products of all types, e.g., they can be incorporated into pates, loaves and chunk in sauce formats. They can be particularly suitable for inclusion in "chunk in sauce" products, e.g., "chunk and gravy", "chunk and jelly" or "chunk and mousse" products. The meat analogues can be typically between about 7 mm and about 30 mm, about 8 mm and about 30 mm, or about 13 mm and about 20 mm in length along the longest dimension. The meat analogues can have a nutritional composition of moisture, protein, fat, and ash. For example, the meat analogues can suitably have a nutrient composition of about 45% to about 65% moisture, or about 50% to about 56% moisture, about 25% to about 36% protein, about 4% to about 13% fat, and about 1% to about 3% ash.

As used herein, the term "meat batter" refers to a thick mixture of water and other substances derived from raw materials, such as meat or meat by-products. They are not emulsions such as mayonnaise or milk, but are dispersions of fat particles and air bubbles in a complex phase composed of water, solubilized meat protein, cellular components and other ingredients. They can also be referred to as a "meat emulsion" or a "meat slurry". These terms are well understood in the art and are used interchangeably. Typically they comprise a continuous phase which is an aqueous medium containing soluble proteins, soluble muscle constituents, segments of muscle fibers, connective tissue fibers, bones, etc. and optionally materials of plant origin materials such as proteins and/or starches and/or fibres and/or minerals. Meat batters/emulsions/slurries can also contain further additives as is common in the art. Meat batters can be obtained by known methods, e.g., by fragmenting frozen meat obtained from animal skeletal muscle to generate meat fragments. can be blended with water, one or more binding agent(s), and optionally other ingredients. Frozen meat can be suitably chopped, crushed and ground to create a meat batter/slurry/emulsion. Typically, the ground meat slurry will be size-reduced by use of a system comprising rotating and static elements, for example, by means of rotating knives on die plates, and finally passes through a hole of characteristic diameter. In various embodiments, the maximum diameter of the hole can be about 0.5 mm, about 1 mm, about 2 mm, about 3 mm, about 4 mm, about 5 mm, about 6 mm, about 7 mm, about 8 mm, about 9 mm, and/or about 10 mm. The resulting finer ground meat emulsion can suitably be transferred to a mixer where water, dry ingredients (e.g., protein powder of vegetable origin) and liquid ingredients (e.g., colourants) can be optionally added to provide a meat batter.

As used herein, the terms "nutritionally complete" or "nutritionally balanced" in reference to a composition means that the composition has known required nutrients to sustain life in proper amounts and proportion based on recommendations of recognized authorities, including governmental agencies. For example, and not by way of limitation, in the context of pet food, such agency can be the United States Food and Drug Administration's Center for Veterinarian Medicine, or the American Feed Control Officials Incorporated, in the field of pet nutrition, except for the additional need for water. For example, and not by way of limitation, in the context of human food, such agency can be the United States Food and Drug Administration (FDA).

As used herein, the term "protein" refers to one or more proteins suitably provided by one or more of the raw materials. The protein can suitably be animal proteins, vegetable proteins or any combination thereof. Animal proteins can include any protein of animal origin (including vertebrate and invertebrate proteins), e.g., proteins derived from mammals, fowl, fish and insects. Examples of suitable animal proteins include those derived from chicken, turkey, beef, lamb, pork, venison, buffalo, duck, kangaroo, shell fish, crustaceans, salmon, tuna, whitefish, etc. They can suitably be derived from muscle meat, organs, tendons, bone, etc. Further suitable animal proteins can include milk or egg derived proteins. Suitable vegetable proteins can include proteins derived from wheat gluten, soy protein isolate, maize, pea, rice, peanuts, hemp, cotton seed, lupine, potato, etc. or blends thereof. The proteins can be in any suitable form, e.g., isolated or partially isolated, concentrated, ground, etc.

As used herein, the melting point of a protein is the temperature at which it changes state from solid to liquid at the pressure selected. The denaturation temperature of a protein can be measured by methods well known in the art, for example by use of a rubber process analyzer. As a rubber process analyzer, a respective analyzer from TA Instruments, Wetzlar, Germany, Model RPA Elite, can be used, measuring viscoelastic properties of protein/moisture samples pursuing a temperature sweep analysis delivering a protein melting range.

As used herein, the term "scraped surface heat exchanger" or "SSHE" refers to a mechanical device having a heated surface and a device for dislodging material from the heated surface by scraping.

As used herein, the term "weight percent" is meant to refer to the quantity by weight of a constituent or component, for example, in the pet food composition as a percentage of the overall weight of the pet food composition. The term "weight percent" can also refer to the quantity by weight of a constituent or component, for example, in the meat analogue as a percentage of the overall weight of the meat analogue. The terms "weight percent," "wt-%," "wt. %", and "wt %" are used interchangeably.

4.2 Methods of Making Meat Analogues

The present disclosure provides for processes and apparatuses for the production of meat analogues. In certain embodiments, the process can include the introduction of a meat better including protein into a first heating unit. The meat batter can be heated to a temperature above the denaturation temperature of the protein in the meat batter, but below the melting point of the protein to produce a first heat-treated product. The first heat-treated product can be transferred to a second heating unit. The first heat-treated product can be heated to a temperature above the melting temperature of the protein to produce a second heat-treated product. In certain embodiments, the second heat-treated product can be cooled, for example, by moving the second heat-treated product through a cooling unit. The second heat-treated product can be cooled to a temperature below water boiling temperature at ambient pressure when exiting the cooling unit. In certain embodiments, the second heat-treated product can be divided into pieces.

The first and second heating units can suitably be any heating system known in the art, e.g., they can suitably comprise a high shear emulsifier, a heat exchanger or a dielectric heater. In some embodiments, at least one of the first and second heating units can include a heat exchanger. In particular embodiments, at least one of the first and second heating units can include a scraped surface heat exchanger. For example, a suitable scraped surface heat exchanger can include a tubular device with a heated jacket surrounding its outer wall, through which heat can be transmitted. Such a tubular device can include a center rotor or shaft with scrapers affixed thereto. When the center rotor or shaft rotates, the scrapers remove product from an inner wall of the tubular device. In certain embodiments, the center rotor or shaft can operate at a speed of from about 100 rpm to about 500 rpm, from about 150 rpm to about 400 rpm, about 200 rpm to about 375 rpm, about 200 rpm, about 250 rpm, about 300 rpm, or about 360 rpm. In use, a mixture of ingredients can be fed into one end of the tubular device and pushed through the device. The heating and the motion through the annular space between the heated inner wall of the cylinder and the center rotor can result in a transformation of the mixture. Scraped surface heat exchangers have the advantage of moving the ingredient mixture constantly through a pipe or similar hollow cylinder that can be arranged such that heat is applied to its external surface. This can be accomplished by encasing the pipe or cylinder in a water bath that can be maintained at a desired temperature, e.g., by encasing the pipe or cylinder in a thermal agent medium, steam chamber, thermo-oil or other suitable heated medium that can be maintained at the desired temperature. In certain embodiments, an external electrical heated outer temperature source can be used. The temperature difference between the interior and exterior of the scraped surface heat exchanger can cause the ingredient mixture to be heated through indirect heating. Scraped surface heat exchangers are well known in the art. In certain embodiments, both the first and the second heating units can include a heat exchanger. In particular embodiments, both the first and second heating units can include a scraped surface heat exchanger. In alternate embodiments, at least one of the first and second heating units can include a heat exchanger. In further alternate embodiments, at least one of the first and second heating units can include a scraped surface heat exchanger.

In certain embodiments, the second heating unit can include a microwave heating unit, a radio frequency heating unit or an Ohmic heating unit. The use of such units in the second heating unit can reduce the residence time of the first heat-treated product in the second heating unit.

In certain embodiments, the process and the apparatus of the present disclosure can comprise the use of additional heating units, for example a heating unit before introducing a meat batter into a first heating unit (e.g., step a) for heating the meat batter to a temperature below the denaturation temperature of the protein, and/or a further heating unit between a first heating unit and a second heating unit (e.g., step a and step b) for further heating the first heat-treated product below the melting temperature of the protein.

In another embodiment, two or more heating units can be operated in parallel in one process step. In another embodiment, two or more heating units can be also operated in series in one process step.

When the meat batter enters the first heating unit, the meat batter can have a temperature of between about 10° C. to about 35° C., about 10° C. to about 30° C., or about 15° C. to about 25° C. In particular embodiments, the meat batter can have a temperature of about 10° C., about 15° C., about 20° C., about 25° C., about 30° C., or about 35° C. upon entering the first heating unit. In certain embodiments, the meat batter can be pumped into the first heating unit at about 800-to about 2000 kPa, about 900 kPa to about 1500 kPa, or about 1000 kPa and about 1250 kPa. In particular embodiments, the meat batter can be pumped into the first heating unit at about 800 kPa, about 900 kPa, about 1000 kPa, about 110 kPa, about 1200 kPa, about 1300 kPa, about 1400 kPa, about 1500 kPa, about 1600 kPa, about 1700 kPa, about 1800 kPa, about 1900 kPa, or about 2000 kPa. The meat batter can be heated as it passes through the first heating unit, e.g., by supplying a heat jacket with steam. In some embodiments, the meat batter can be heated in the first heating unit to a temperature of from about 90° C. to about 125° C., about 100° C. to about 125° C., about 90° C. to about 115° C., about 100° C. to about 115° C., about 90° C. to about 110° C., or about 100° C. to about 110° C. In particular embodiments, the meat batter can be heated in the first heating unit to a temperature of about 90° C., about 100° C., about 100°

C., about 115° C., or about 125° C. In certain embodiment, the meat batter can be heated in the first heating unit to a temperature of at least about 90° C., at least about 100° C., at least about 100° C., at least about 115° C. In further embodiments the first heat-treated product can be heated in the second heating unit to a temperature of from about 140° C. to about 170° C., about 145° C. to about 170° C., about 150° C. to about 170° C., about 155° C. to about 170° C., about 160° C. to about 170° C., about 140° C. to about 165° C., about 145° C. to about 165° C., about 150° C. to about 165° C., about 155° C. to about 165° C., or about 160° C. to about 165° C. In particular embodiments, the first heat-treated product can be heated in the second heating unit to a temperature of about 140° C., about 145° C., about 150° C., about 155° C., about 160° C., about 165° C., or about 170° C. In certain embodiments, the first heat-treated product can be heated in the second heating unit to a temperature of at least about 140° C., at least about 150° C., or at least about 160° C.

The ratio of residence time of the batter in the first heating unit to the residence time of the first heat-treated product in the second heating unit can be from about 1:1 to about 14:2, from about 9:8 or 8:5 to about 6:2, and from about 4:2 to about 7:3. In particular embodiments, the residence time of the first batter in the first heating unit can be two thirds and one third residence time of the first heat-treated product in the second heating unit. In certain embodiments, the residence time of the first batter in the first heating unit can be from about 30% to about 65%, about 45% to about 60%, or about 50% to about 55% and the residence time of the first-heat treated product in the second heating unit can be from about 35% to about 70%, about 40% to about 55%, or about 45% to about 50%. In particular embodiments, the residence time of the first batter in the first heating unit can be about 50%, about 53.5%, or about 60% and the residence time of the first heat-treated product in the second heating unit can be about 40%, about 46.5%, or about 50%. In certain embodiments, the pressure in the first heating unit and the pressure in the second heating unit can exceed the water vapor pressure at the respective local temperature. In certain embodiments, the pressure in the first heating unit and the pressure in the second heating unit can be substantially equal. In certain embodiments, the pressure in the first heating unit and the pressure in the second heating unit can be difference. The pressure of the first heating unit and the second heating can each independently be in a range of between from about 800 kPa to about 2000 kPa, about 800 to about 1,800 kPa, about 1,000 to about 1,800 kPa, about 1,000 to about 1,500 kPa, or about 1000 kPa to about 1250 kPa. In particular embodiments, the pressure of the first heating unit and the second heating unit can independently be around 800 kPa, about 900 kPa, about 1000 kPa, about 1100 kPa, about 1200 kPa, about 1250 kPa, about 1500 kPa, about 1800 kPa, or about 2000 kPa. In particular embodiments, the first and second heating units can each have a pressure of about 1200 kPa. This pressure range can allow for efficiency of energy transfer and reduction of wear of the equipment, for example the scrapers in a scraped surface heat exchanger. The second heat-treated product can suitably be divided into pieces. In certain embodiments, the second heat-treated product can be divided at a temperature of from about 40° C. to about 80° C., about 40° C. to about 70° C., about 50° C. to about 80° C., or about 50° C. to about 70° C. In particular embodiments, the second heat-treated product can be divided at a temperature at about 40° C., about 45° C., about 50° C., about 55° C., about 60° C., about 65° C., about 75° C., or about 80° C. In certain embodiments, the second heat-treated product can be divided at a temperature of at least about 40° C., at least about 50° C., at least about 60° C., or at least about 70° C.

In certain embodiments, a volume ratio of the first heating unit to the second heating unit can be about 1.5-1:1, about 1.2-1:1 or about 1.15-1:1. In particular embodiments, the volume ratio of the first heating unit to the second heating unit can be about 1.5:1, about 1.8:1, about 1:1, about 1.2:1, or about 1.15:1. In certain embodiments, the first heating unit can have a volume of about 15 L to about 20 L, about 16 L to about 18 L, about 17 L, or about 18 L. In certain embodiments, the second heating unit can have a volume of about 8 L to about 20 L, about 8 L to about 18 L, about 9 L, about 15 L, about 15.7 L, about 16 L, or about 18 L. In certain embodiments, the first and second heating units can have a surface to volume ratio of about 50 m2/m3 to about 70 m2/m3, or about 60 m2/m3. The first and second heating units can each be heated, e.g., by supplying steam to a respective heat jacket. For the first heating unit, the applied steam temperature can be from about 130° C. to about 145° C., about 135° C. to about 142° C., or from about 138° C. to about 140° C. In certain embodiments, for the first heating unit, the applied steam temperature can be about 130° C., about 135° C., about 138° C., about 140° C., about 142° C., or about 145° C. For the second heating unit, the applied steam temperature can be from about 160° C. to about 180° C., about 165° C. to about 175° C., about 165° C. to about 172° C., or about 166° C. to about 168° C. In case that the volume ratio of the first heating unit to the second heating unit is within the above defined range and if the ratio of residence time as well as applied steam temperature of, especially, the first heating unit is appropriately selected as defined above, an overall capacity for a process according to the invention may be increased by about 20% to about 30%. In particular embodiments, the overall capacity of the processes of the present disclosure can be increased by about 20%, about 22%, about 25%, about 28%, or about 30%.

The meat batter utilized in the processes of the present disclosure can include a mixture of one or more proteins. The one or more proteins can have differing denaturation temperatures and melting temperatures. In certain embodiments, substantially all the protein in the meat batter can be denatured in the first heating unit. In certain embodiments, in the second heating unit, at least about 50 wt-%, about 60 wt-%, about 70 wt-%, about 80 wt-% or about 90 wt-% of protein, based on the total amount of protein in the meat batter, can be melted. In particular embodiments, substantially all the protein can be melted. In certain embodiments, enough protein can be melted in order to form a cohesive and continuous outer phase of the second heat-treated product that can carry non-melted other proteins, fibers, bone particles, etc.

In certain embodiments, the meat batter can include the one or more proteins, one or more liquid ingredients, and one or more additional ingredients. The meat batter can include from about 60% to about 95%, about 70% to about 95%, or about 80% to about 95% by weight of one or more proteins, based on the total weight of the meat batter. In certain embodiments, the meat batter can include about 60%, about 70%, about 80%, about 90%, or about 90.8% by weight of one or more proteins, based on the total weight of the meat batter. In particular embodiments, the one or more proteins can include meat, animal derivatives, and combinations thereof. A person skilled in the art will appreciate that a wide variety of proteins are suitable for use with the present disclosure. The meat batter can include one or more liquids in an amount of from about 1% to about 10%, about 1% to about 8%, or about 1% to about 5% by weight, based on the total weight of the meat batter. In certain embodiments, the meat batter can include about 1%, about 2%, about 3%, about 4%, about 4.7%, about 5%, about 6%, about 7%, about 8%, about 9%, or about 10% by weight of one or more liquids, based on the total weight of the meat batter. In particular embodiments, the one or more liquid ingredients can include water. A person skilled in the art will appreciate that a wide variety of liquid ingredients are suitable for use with the present disclosure. The meat batter can include one or more additional ingredients in an amount of from about 1% to about 10%, about 1% to about 8%, or about 1% to about 5% by weight, based on the total weight of the meat batter. In certain embodiments, the meat batter can include about 10%, about 2%, about 3%, about 4%, about 4.5%, about 5%, about 6%, about 7%, about 8%, about 9%, or about 10% by weight of one or more additional ingredients, based on the total weight of the meat batter. In particular embodiments, the one or more additional ingredients can include at least one of vitamins, minerals, palatants, colorants, etc. A person skilled in the art will appreciate that a wide variety of additional ingredients are suitable for use with the present disclosure.

In particular embodiments, the meat batter can include from about 70% to about 95% by weight of one or more proteins, from about 1% to about 5% by weight of one or more liquid ingredients, and from 1% to about 5% by weight of one or more additional ingredients, based on the total weight of the meat batter. The one or more meat proteins can include meat and animal derivatives. The one or more liquid ingredients can include water. The one or more additional ingredients can include at least one of vitamins, minerals, palatants, colorants, etc.

In certain embodiments, the meat batter can further include crude protein, moisture, and fat to provide a semi-solid mixture form, for example, in order to achieve a nutritionally complete pet food product. In certain embodiments, the semi-solid mixture can include from about 20% to about 45%, about 25% to about 40%, or about 30% to about 35% crude protein by weight, based on the total weight of the semi-solid mixture. In particular embodiments, the semi-solid mixture can include about 25%, about 30.5%, or about 45% by weight crude protein, based on the total weight of the semi-solid mixture. In certain embodiments, the semi-solid mixture can include from about 40% to about 65%, about 45% to about 60%, or from about 55% to about 60% by weight moisture, based on the total weight of the semi-solid mixture. In particular embodiments, the semi-solid mixture can include about 50%, about 55%, or about 59% moisture by weight, based on the total weight of the semi-solid mixture. In certain embodiments, the semi-solid mixture can include from about 1% to about 10%, about 1% to about 8%, or about 1% to about 5% by weight fat, based on the total weight of the semi-solid mixture. In particular embodiments, the semi-solid mixture can include about 1%, about 4.5%, or about 5% by weight fat, based on the total weight of the semi-solid mixture.

In particular embodiments, the semi-solid mixture can include from about 30% to about 35% by weight crude protein, about 55% to about 60% by weight moisture, and from about 1% to about 5% by weight fat, based on the total weight of the semi-solid mixture. The crude protein can include vegetable protein powder (e.g., one part) containing min. 75% protein (vital wheat gluten).

In certain embodiments, the melting range for the proteins used can be determined, for example, by rheological measurements, wherein the melting range is the temperature range, where after an increase in viscosity due to the denaturing (unfolding) of the proteins a drop of viscosity is observed indicating a change from a suspension of solids into a homogeneous liquid phase. In certain embodiments, the melting point of a protein can be measured by methods well known in the art, for example by differential scanning calorimetry (DSC). For individual proteins, respective data of denaturation temperature and melting point can be also obtained from references as known in the art.

The second heat treated product can be a layered and/or aligned product formed as the cooled material, e.g., in step (c). As the melted material solidifies, a layered fibrous meat analogue structure can be formed. Cooling and/or dividing the material (e.g., steps (c) and/or step (d)) can be optionally performed under a pressure of from about 800 kPa to about 2000 kPa, about 900 kPa to about 1800 kPa, or about 1000 kPa to about 1500 kPa so that the protein solidifies step by step in layers which create a fibrous structure. In particular embodiments, Thus, in the cooling step, the aggregate of the protein can change from a liquid melt to a solid phase.

In other words, the protein setting can be the controlled solidification of melted protein. The formation of meat-like fibers can be the direct result of an appropriately controlled cooling. As described above, if the first heat-treated product has been heated above the melting point of the protein, at least part of that protein (or the protein mixture) can also be melted. Once proteins have been brought to the melted state, upon cooling, they can solidify into a strong, elastic mass with leather-like properties. This mass does not easily re-melt and cannot be pumped mechanically. Thus, it is important that, once melted, protein can be maintained in motion and cooled in a cooling unit from which solidified material can be continuously discharged.

The second heat-treated product can exit the second heating unit at a temperature of from about 140° C. to about 170° C., about 150° C. to about 165° C., about 158° C. to about 160° C., or about 155° C. to about 160° C. In particular embodiments, the second heat-treated product can exit the second heating unit at a temperature of about 140° C., about 145° C., about 150° C., about 155° C., about 160° C., about 165° C., or about 170° C. The second heat-treated product can be cooled to a temperature below water boiling temperature in a cooling unit, e.g., using a tubular cooling zone cooled with water. In certain embodiments, the second heat-treated product can be cooled to a temperature of less than about 85° C., less than about 80° C., or less than about 70° C. In certain embodiments, a rectangular-shaped cooling die design can be used. The second heat-treated product can be transferred through the cooling unit, e.g., along a cool surface, and can be formed into a layered fibrous structure as the melt solidifies (as the product temperature drops below its melting point). This can occur under pressure and in motion and the protein solidifies step by step in layers to create fibrous structures.

In certain embodiments, the second heat-treated product can be divided. For example and not by way of limitation, the second heat-treated product can be divided using a grid or rotary cutting device. Dividing can be performed in one or more steps, for example, a first cutting can be performed using a grid cutter followed by a second cutting using a rotary cutter. The resulting meat analogues can be irregular, random or essentially random in shape. Optionally, the resulting meat analogues can be transferred to an inspection station for visual inspection to facilitate quality control, manual or automatic, e.g., using a digital camera and suitable image recognition software.

In particular embodiments, the present disclosure provides a process for the production of a meat analogue, comprising: a) introducing a meat batter which comprises protein into a first heating unit and heating the meat batter to a temperature above the denaturation temperature of the protein in the meat batter, but below the melting point of the protein to produce a first heat-treated product, and b) transferring the first heat-treated product to a second heating unit and heating the first heat-treated product to a temperature above the melting temperature of the protein to produce a second heat-treated product, c) cooling the second heat-treated product by moving through a cooling unit, so that the second heat-treated product has a temperature below water boiling temperature at ambient pressure when exiting the cooling unit, and d) dividing the cooled second heat-treated product into pieces. A volume ratio of the first heating unit to the second heating unit can be from about 1.5-1:1 or about 1.2-1:1. At least one of the first and second heating units can include a scraped surface heat exchanger. In particular embodiments, the first and second heating units both comprise a scraped surface heat exchanger. The meat batter can be heated in the first heating unit to a temperature of from about 90° C. to about 125° C. The first heat-treated product can be heated in the second heating unit to a temperature of from about 140° C. to about 170° C. The ratio of residence time of the meat batter in the first heating unit to the residence time of the first heat-treated product in the second heating unit can be from about 1:1 to about 14:2 or from about 9:8 to about 6:2. The pressure in the first heating unit can be from about 800 kPa to about 2000 kPa, and/or the pressure in the second heating unit can be from about 800 kPa to about 2000 kPa.

In particular embodiments, a meat batter can be fed into the first heating unit. The first heating unit can have a volume of from about 16 L to about 18 L, or about 18 L and a surface to volume ratio of from about 50 m2/m3 to about 70 m2/m3, or about 60 m2/m3 under from about 1000 kPa to about 1500 kPa, or about 1200 kPa pressure. The first heating unit can continuously be supplied with steam at a temperature of between from about 130° C. to about 145° C., or from about 138° C. to about 140° C. and the shaft can be operated at from about 200 rpm to about 375 rpm, or about 250 rpm. The outlet temperature of the material from the first heating unit can be between from about 100° C. to about 115° C., or from about 107° C. to about 109° C. The material can be transferred to the second heating unit. The second heating unit can have a volume of from about 8 L to about 20 L, or about 15.7 L and a surface volume ratio of from about 50 m2/m3 to about 70 m2/m3, or about 60 m2/m3 under from about 1000 kPa to about 1500 kPa, or about 1200 kPa product pressure. The second heating unit can be continuously supplied with steam at a temperature between from about 165° C. to about 170° C., or from about 166° C. to about 168° C. and the shaft can be operated at from about 200 rpm to about 375 rpm, or about 360 rpm. The outlet temperature of the material from the second heating unit can be from about 150° C. to about 165° C., or from about 158° C. to about 160° C. The residence time in the two heating units can be from about 50% to about 55%, or about 53.5% in the first heating unit and from about 45% to about 50%, or about 46.5% in the second heating unit. The material can be directed to a cooling unit through which the temperature of the material was reduced to less than about 80° C. or less than about 70° C. A solid material obtained therefrom can be cut to produce meat analogues with internal fibrosity.

In particular embodiments, a meat batter can be fed into the first heating unit. The first heating unit can have a volume of from about 16 L to about 18 L, or about 17 L and a surface to volume ratio of from about 50 m2/m3 to about 70 m2/m3, or about 60 m2/m3 under from about 1000 kPa to about 1500 kPa, or about 1200 kPa pressure. The first heating unit can continuously be supplied with steam at a temperature of between from about 130° C. to about 165° C. or from about 134° C. to about 136° C. and the shaft can be operated at from about 150 rpm to about 400 rpm, or about 200 rpm. The outlet temperature of the material from the first heating unit can be between 100° C. to about 115° C., about 107° C. to about 109° C., or about 109° C. to about 111° C. The material can be transferred to the second heating unit. The second heating unit can have a volume of from about 8 L to about 12 L, or about 9.7 L and a surface volume ratio of from about 50 m2/m3 to about 70 m2/m3, or about 60 m2/m3 under from about 1000 kPa to about 1500 kPa, or about 1200 kPa product pressure. The second heating unit can be continuously supplied with steam at a temperature between from about 165° C. to about 170° C., or about 166° C. to about 168° C. and the shaft can be operated at from about 200 rpm to about 375 rpm, or about 300 rpm. The outlet temperature of the material from the second heating unit can be from about 150° C. to about 165° C., or from about 158° C. to about 160° C. The residence time in the two heating units can be about two-thirds in the first heating unit and about one third in the second heating unit. The material can be directed to a cooling unit through which the temperature of the material was reduced to less than about 80° C. or less than about 70° C. A solid material obtained therefrom can be cut to produce meat analogues with internal fibrosity.

The present disclosure provides meat analogues prepared by the disclosed processes. Such meat analogues can have improved palatability as compared to meat analogues prepared by conventional processes. The present disclosure further provides human and pet food products including the meat analogue produced by the processes of the present disclosure. In certain embodiments, a human food product comprises a meat analogue of the present disclosure. In certain embodiments, a pet food product comprises a meat analogue of the present disclosure.

The present disclosure also provides apparatuses for the production of meat analogues which have all the advantages discussed for the processes of the present disclosure. The apparatus of the present disclosure can include at least two heating units. In certain embodiments, the heating units can be arranged in series. The heating units can be operable to heat a meat batter or heat-treated product to a predetermined temperature. In particular embodiments, at least one of the one or more heating units can be SSHE heating units. The apparatus can further include one or more transfer means. The one or more transfer means can be operable to transfer a meat better or heat-treated product from one component of the apparatus to another. For example, and not by way of limitation, the one or more transfer means can transfer a meat batter or heat-treated product into/out of a heating unit or between heating units. In certain embodiments, the apparatus can include a cooling unit. The cooling unit can be located downstream from the one or more heating units. In certain embodiments, the cooling unit can be operable to cool down a heat-treated product to a predetermined temperature. In certain embodiments, the apparatus can include a dividing unit. The dividing unit can be located downstream from the cooling unit. In particular embodiment, the dividing unit can divide the heat-treated product into pieces.

In particular embodiments, the apparatus can include: i) a first heating unit, ii) a first transfer means for transferring a meat batter comprising protein into the first heating unit, the first heating unit being operable to be heated to a temperature above the denaturation temperature of the protein but below the melting temperature of the protein, iii) a second heating unit being operable to heat a first heat-treated product obtained from the first heating unit to a temperature above the melting temperature of the protein in the first heat-treated product, wherein the first heating unit and the second heating unit are arranged in series, iv) a cooling unit located downstream the second heating unit and operable to cool down a second heat-treated product obtained from the second heating unit below water boiling temperature at ambient pressure when exiting the cooling unit, and v) a dividing unit located downstream the cooling unit suitable for dividing cooled down second heat-treated product obtained from the cooling unit into pieces.

In certain embodiments, the apparatus can also additionally include one or more of: i) a grinder for grinding meat, ii) a mixer, iii) an emulsifying unit or a batter pump installed upstream of the first transfer means, iv) a conditioning unit, v) a packaging unit, or vi) a sterilization unit installed downstream of the second heating unit.

The first transfer means can suitably be a pump or the like which allows transfer of the meat batter, the first heat-treated product and the second heat-treated product through all steps of the apparatus. If necessary further transfer means can be provided, for example between the first heating unit and the second heating unit, between the second heating unit and the cooling unit or between the cooling unit and the dividing unit. The first transfer means can be also any type of a pump or the like. In certain embodiments, the processes and apparatuses of the present disclosure do not utilise and/or comprise a steam tunnel.

In certain embodiments, the first and/or the second heating unit(s) can suitably be slightly tilted. In such embodiments, the heat-treated product can enter the heating unit(s) from below, allowing air to be forced out of the units, in order to ensure improved heat transfer.

In particular embodiments, the present disclosure provides an apparatus for the production of a meat analogue comprising: i) a first heating unit, ii) a first transfer means for transferring a meat batter which comprises protein into the first heating unit, the first heating unit being operable to heat the meat batter to a temperature above the denaturation temperature of the protein but below the melting temperature of the protein, iii) a second heating unit being operable to heat a first heat-treated product obtained from the first heating unit to a temperature above the melting temperature of the protein in the first heat-treated product, wherein the first heating unit and the second heating unit are arranged in series, iv) a cooling unit located downstream the second heating unit and operable to cool down a second heat-treated product obtained from the second heating unit below water boiling temperature at ambient pressure when exiting the cooling unit, and v) a dividing unit located downstream the cooling unit suitable for dividing cooled down second heat-treated product obtained from the cooling unit into pieces. The apparatus can additionally include one or more of: i) a grinder, ii) a mixer, iii) an emulsifying unit or an emulsion pump installed upstream of the first transfer means, iv) a conditioning unit, v) a packaging unit, or vi) a sterilization unit installed downstream of the second heating unit. A volume ratio of the first heating unit to the second heating unit is from about 1.5-1:1 or about 1.2-1:1. At least one of the first and second heating units can include a scraped surface heat exchanger. In particular embodiments, the first and second heating units both comprise a scraped surface heat exchanger. The cooling unit can be operable to cool down the second heat-treated product to a temperature of less than about 80° C. The first heating unit can be operable to heat the meat batter to a temperature of from about 90° C. to about 125° C. The second heating unit can be operable to heat the first heat-treated product to a temperature of from about 140° C. to about 170° C.

4.3 Methods of Using Meat Analogues

In certain non-limiting embodiments, the meat analogues produced by processes and apparatuses of the present disclosure can be used alone or incorporated into pet or human food products. Such end food products can include, for example, and not by way of limitation, a mixed pet food product. Meat analogues of the present disclosure can be incorporated into pates, loaves and chunk in sauce formats. For example, meat analogues of the present disclosure can be incorporated in "chunk in sauce" products, e.g., "chunk and gravy", "chunk and jelly" or "chunk and mousse" products.

5. EXAMPLES

The presently disclosed subject matter will be better understood by reference to the following Examples, which are provided as exemplary of the disclosure, and not by way of limitation.

Example 1

The present Example provides processes for the production of meat analogues in accordance with certain embodiments of the present disclosure.

Three parts of a slurry containing 90.8% meat and animal derivatives, 4.7% water, and 4.5% of at least one of vitamins, minerals, palatants, colorants, etc. (all percentages are weight percentages based on the total weight of the slurry) as to achieve a nutritionally complete cat food finished product were mixed with one part vegetable protein powder containing min. 75% protein (vital wheat gluten) to form a semi-solid mixture containing 30.5% crude protein, 59% moisture and 4.5% fat (all percentages of the semi-solid mixture are based on the total weight of the semi-solid mixture).

The mixture was fed into a first single scraped surface heat exchanger (SSHE) unit with a volume of approx. 18 L and a surface to volume ratio of 60 $m^2/m^3$ under 1,200 kPa product pressure. The first SSHE heating unit was continuously supplied with steam at a temperature between 138-140° C. and the shaft was operated at 250 rpm. The outlet temperature of the material from the first SSHE heating unit was between 107° C. and 109° C. The material was immediately directed into a second SSHE heating unit with a volume of approx. 15.7 L and a surface to volume ratio of 60 $m^2/m^3$ under 1,200 kPa product pressure. The second SSHE heating unit was continuously supplied with steam at a temperature between 166-168° C. and the shaft was operated at 360 rpm. The outlet temperature of the material from the second SSHE heating unit was between 158-160° C. The residence time in the two heating units was distributed as about 53.5% in the first heating unit and about 46.5% in the second heating unit. The material was then directed to a cooling area through which its temperature was brought down to below 80° C. The solid material obtained was cut to produce meat analogues with internal fibrosity.

Example 2

The present Example provides processes for the production of meat analogues in accordance with certain embodiments of the present disclosure.

Three parts of a slurry containing 90.8% meat and animal derivatives, 4.7% water, and 4.5% of at least one of vitamins, minerals, palatants, colorants, etc. (all percentages are weight percentages based on the total weight of the slurry) as to achieve a nutritionally complete cat food finished product were mixed with one part vegetable protein powder containing min. 75% protein (vital wheat gluten) to form a semi-solid mixture containing 30.5% crude protein, 59% moisture and 4.5% fat (all percentages of the semi-solid mixture are based on the total weight of the semi-solid mixture).

The mixture was fed into a first SSHE unit with a volume of approx. 17 L and a surface to volume ratio of 60 m2/m3 under 1,200 kPa product pressure. The first SSHE unit was continuously supplied with steam at a temperature between 134-136° C. and the shaft was operated at 200 rpm. The outlet temperature of the material from the first SSHE heating unit was between 109° C. and 111° C. The material was immediately directed into a second SSHE heating unit with a volume of approx. 9.7 L and a surface to volume ratio of 60 m2/m3 under 1,200 kPa product pressure. The second SSHE heating unit was continuously supplied with steam at a temperature between 166-168° C. and the shaft was operated at 300 rpm. The outlet temperature of the material from the second SSHE heating unit was between 158-160° C. The residence time in the two heating units was distributed as two-thirds in the first heating unit and one third in the second heating unit. The material was then directed to a cooling area through which its temperature was brought down to below 80° C. The solid material obtained was cut to produce meat analogues with internal fibrosity.

Comparative Example 3

The present Example provides a comparative process for the production of meat analogues using one heating unit.

Three parts of meat emulsion containing 90.8% meat and animal derivatives, 4.7% water, and 4.5% of at least one of vitamins, minerals, palatants, colorants, etc. (all percentages are weight percentages based on the total weight of the slurry) as to achieve a nutritionally complete cat food finished product were mixed with one part vegetable protein powder containing min. 75% protein (vital wheat gluten) to form a semi-solid mixture containing 30.5% crude protein, 59% moisture and 4.5% fat (all percentages of the semi-solid mixture are based on the total weight of the semi-solid mixture).

The mixture was fed into a SSHE heating unit with a volume of approx. 14.6 L and a surface to volume ratio of 60 m2/m3 under 1,200 kPa product pressure. The SSHE heating unit was continuously supplied with steam at a temperature between 166-168° C. and the shaft was operated at 300 rpm. The outlet temperature of the material from this heating unit was between 158-160° C.

The material was then directed to a cooling area through which its temperature was brought down to below 80° C. The solid material obtained was cut to produce meat analogues with internal fibrosity.

A comparison of food intake by cats between the product manufactured using two SSHE heating units and the product manufactured using one SSHE heating unit showed cats eating on average 21% less (by weight) from the product manufactured using a single SSHE heating unit, a statistically significant loss under conditions tested.

Comparative Example 4

The present Example provides a comparative process for the production of meat analogues in which the outlet temperature of a first heating unit is below coagulation temperature and the outlet temperature of a second heating unit is below melting temperature.

Three parts of meat emulsion containing 90.8% meat and animal derivatives, 4.7% water, and 4.5% of at least one of vitamins, minerals, palatants, colorants, etc. (all percentages are weight percentages based on the total weight of the slurry) as to achieve a nutritionally complete cat food finished product were mixed with one part vegetable protein powder containing min. 75% protein (vital wheat gluten) to form a semi-solid mixture containing 30.5% crude protein, 59% moisture and 4.5% fat (all percentages of the semi-solid mixture are based on the total weight of the semi-solid mixture).

The mixture was fed into a first SSHE heating unit with a volume of approx. 17 L and a surface to volume ratio of 60 m2/m3 under 1,200 kPa product pressure. The first SSHE heating unit was continuously supplied with steam at a temperature between 120-125° C. and the shaft was operated at 200 rpm. The outlet temperature of the material from the first SSHE heating unit was below coagulation temperature and between 60-70° C. The material was immediately directed into a second SSHE heating unit with a volume of approx. 9.7 L and a surface to volume ratio of 60 m2/m3 under 1,200 kPa product pressure. The second SSHE heating unit was continuously supplied with steam at a temperature between 120-125° C. and the shaft was operated at 200 rpm. The outlet temperature of the material from this heating unit was below melting temperature and between 80-85° C. The residence time in the two heating units was distributed as two-thirds in the first heating unit and one third in the second heating unit. The material was then directed to a cooling area through which its temperature was brought down to below 80° C.

No internal fibrosity was observed in the outlet material, only protein coagulation.

Comparative Example 5

The present Example provides a comparative process for the production of meat analogues in which the outlet temperature of a second heating unit is below melting temperature.

Three parts of meat emulsion containing 90.8% meat and animal derivatives, 4.7% water, and 4.5% of at least one of vitamins, minerals, palatants, colorants, etc. (all percentages are weight percentages based on the total weight of the slurry) as to achieve a nutritionally complete cat food finished product were mixed with one part vegetable protein powder containing min. 75% protein (vital wheat gluten) to form a semi-solid mixture containing 30.5% crude protein, 59% moisture and 4.5% fat (all percentages of the semi-solid mixture are based on the total weight of the semi-solid mixture).

The mixture was fed into a first SSHE unit with a volume of approx. 17 L and a surface to volume ratio of 60 $m^2/m^3$ under 1,200 kPa product pressure. The first SSHE unit was continuously supplied with steam at a temperature between 134-136° C. and the shaft was operated at 200 rpm. The outlet temperature of the material from the first heating unit was between 90-95° C. The material was immediately directed into a second SSHE unit with a volume of approx. 9.7 L and a surface to volume ratio of 60 m2/m3 under 1,200 kPa product pressure. The second SSHE heating unit was continuously supplied with steam at a temperature between 166-168° C. and the shaft was operated at 250 rpm. The outlet temperature of the material from the second SSHE heating unit was below melting temperature and between 120-125° C. The residence time in the two heating units was distributed as two-thirds in the first heating unit and one third in the second heating unit. The material was then directed to a cooling area through which its temperature was brought down to below 80° C.

No internal fibrosity was observed in the outlet material, only protein coagulation.

Although the presently disclosed subject matter and its advantages have been described in detail, it should be understood that various changes, substitutions and alterations can be made herein without departing from the spirit and scope of the application as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein can be utilized according to the presently disclosed subject matter. Accordingly, the appended claims are intended to include within their scope such processes, machines, manufacture, compositions of matter, means, methods, or steps.

For any patents, patent applications, publications, product descriptions, and protocols are cited throughout this application, the disclosures of all of which are incorporated herein by reference in their entireties for all purposes.

The invention claimed is:

1. A process for the production of a meat analogue, comprising:
   a) introducing a meat batter which comprises protein into a first scraped surface heat exchanger and heating the meat batter to a temperature from about 90° C. to about 125° C. by supplying steam with a temperature of 130-145° C. to the first scraped surface heat exchanger, which is above the denaturation temperature of the protein in the meat batter, but below the melting point of the protein to produce a first heat-treated product,
   b) transferring the first heat-treated product to a second scraped surface heat exchanger and heating the first heat-treated product to a temperature from about 140° C. to about 170° C. by supplying steam with a temperature of 160-180° C. to the second scraped surface heat exchanger, which is above the melting temperature of the protein to produce a second heat-treated product,
   c) cooling the second heat-treated product by moving through a cooling unit under a pressure of from about 800 kPa to about 2000 kPa, so that the second heat-treated product has a temperature below water boiling temperature at ambient pressure when exiting the cooling unit, and
   d) dividing the cooled second heat-treated product into pieces,
   wherein a volume ratio of the first scraped surface heat exchanger to the second scraped surface heat exchanger is from 1.8:1 to 1.2:1 and a ratio of residence time of the meat batter in the first scraped surface heat exchanger to residence time of the first heat-treated product in the second scraped surface heat exchanger is from 9:8 to 6:2.

2. The process of claim 1, wherein the pressure in the first scraped surface heat exchanger is from about 800 kPa to about 2000 kPa, and/or the pressure in the second scraped surface heat exchanger is from about 800 kPa to about 2000 kPa.

3. The process of claim 1, wherein the meat analogue produced has improved palatability as compared to meat analogues prepared by conventional processes.

* * * * *